United States Patent
Krökel et al.

(10) Patent No.: US 8,140,214 B2
(45) Date of Patent: *Mar. 20, 2012

(54) METHOD AND DEVICE FOR DETERMINING THE SPEED OF A VEHICLE

(75) Inventors: Dieter Krökel, Meckenbeuren (DE);
Thomas Fechner, Kressbronn (DE);
Helmut Riedel, Oberhausen (DE);
Holger Grunleithner, Ingolstadt (DE);
Robert Thiel, Frietal (DE)

(73) Assignee: Conti Temic Microelectronic GmbH, Nuremberg (DE)

(*) Notice: Subject to any disclaimer, the term of this patent is extended or adjusted under 35 U.S.C. 154(b) by 1294 days.

This patent is subject to a terminal disclaimer.

(21) Appl. No.: 11/792,981

(22) PCT Filed: Nov. 16, 2005

(86) PCT No.: PCT/DE2005/002047
§ 371 (c)(1),
(2), (4) Date: Jun. 13, 2007

(87) PCT Pub. No.: WO2006/063546
PCT Pub. Date: Jun. 22, 2006

(65) Prior Publication Data
US 2008/0091315 A1    Apr. 17, 2008

(30) Foreign Application Priority Data

Dec. 14, 2004 (DE) .................... 10 2004 060 402

(51) Int. Cl.
*G01P 3/38*    (2006.01)

(52) U.S. Cl. ........... 701/32.5; 701/1; 702/142; 702/149; 348/142

(58) Field of Classification Search ........ 701/1, 28, 701/29; 348/142, 148; 702/142, 149
See application file for complete search history.

(56) References Cited

U.S. PATENT DOCUMENTS

| | | | |
|---|---|---|---|
| 6,704,621 B1* | 3/2004 | Stein et al. | 701/1 |
| 6,753,902 B1* | 6/2004 | Kashiwazaki | 348/119 |
| 2002/0080019 A1* | 6/2002 | Satoh et al. | 340/436 |
| 2003/0141762 A1* | 7/2003 | Sartori et al. | 307/10.1 |
| 2004/0042638 A1* | 3/2004 | Iwano | 382/104 |
| 2004/0210343 A1* | 10/2004 | Kim et al. | 700/245 |
| 2004/0221790 A1* | 11/2004 | Sinclair et al. | 116/62.1 |
| 2005/0062616 A1* | 3/2005 | Vernon-Dier et al. | 340/908 |
| 2005/0102083 A1* | 5/2005 | Xu et al. | 701/70 |

FOREIGN PATENT DOCUMENTS

| | | | |
|---|---|---|---|
| JP | 61250562 A | | 11/1986 |
| JP | 4-301571 A | * | 10/1992 |
| JP | 5120428 A | | 5/1993 |
| JP | 7-260809 A | * | 10/1995 |
| JP | 8094380 A | * | 4/1996 |
| JP | 2002-277481 A | * | 9/2002 |

* cited by examiner

*Primary Examiner* — Thomas Black
*Assistant Examiner* — Ce Li

(57) ABSTRACT

The invention relates to a method for determining a speed of a vehicle (1), whereby at least two images (A, B) of an area surrounding the vehicle are recorded in time succession using a camera on the vehicle (1), and between the images (A, B) changes (2) in a position and/or a size of at least one object (X) contained in the images (X) are determined, and from the changes, a speed of the vehicle (1) is determined relative to the object (X).

11 Claims, 2 Drawing Sheets

METHOD AND DEVICE FOR DETERMINING THE SPEED OF A VEHICLE

This application is the U.S. national phase of international application PCT/DE05/02047 filed Nov. 16, 2005, which designated the U.S. and which claims the benefit of priority of German Patent Application Number 10 2004 060 402.9 filed Dec. 14, 2004. The contents of each of the aforementioned documents are incorporated by reference herein in their entirety.

BACKGROUND OF THE INVENTION

The invention relates to a method for determining a speed of a vehicle.

In vehicles, the speed is normally measured indirectly via the wheel speed. In order to record the wheel speed, inductive transmitters or Hall sensors are commonly used. Inductive transmitters or speed sensors using the induction principle are passive sensors which supply a voltage signal proportionate to the speed. The speed sensor scans an impulse disc. Since the movement of the impulse disc is a prerequisite for the generation of the voltage by the sensor, the passive speed sensor permits no zero speed measurement. Hall sensors are active speed sensors which are based on the Hall effect or which use the magneto-resistance principle. These sensors can already emit a zero speed signal.

For both sensors, in borderline situations such as accelerating, braking or skidding, the speed measured indirectly based on the wheel speed does not coincide with the real speed on the ground. The real speed vector can only be inadequately determined via the wheel speed. Even when driving very slowly, as in "stop and go" situations, the speed is too imprecisely measured via the wheel speed. For driver assistance systems such as a traffic jam assistant, the precise speed is an absolute requirement, however, in order to correctly trigger the actuators.

On an optical basis, a system exists which is produced by CORRSYS-DATRON which senses the sub-ground using crossed grids, and which is able to determine to a very high degree of precision the real speed vector (VDI reports 1731, 2003, o.25ff, "Oitteroptische Sensorik zur berührungslosen Längsund uergeschwindigkeitsmessung", (Optical grid sensors for non-contact longitudinal and transverse speed measurement) J. Haus, R. Schafer)—This system has been established on the market for reference measurements, but due to its high cost it is not used for measuring speed during standard driving operations.

The object of the invention is therefore to provide an improved method and a device which enable a speed of a vehicle to be determined at low cost.

SUMMARY OF THE INVENTION

The object is attained by a method for determining a speed of a vehicle (1), whereby at least two images (A, B) of an area surrounding the vehicle are recorded in time succession using a mono-camera on the vehicle (1), and between the images (A, B), changes (2) in a position and/or a size of at least one object (X) contained in the images (X) are determined, and from the changes, a speed of the vehicle (1) is determined relative to the object (X). The object is also obtained by a device for implementing the method characterized by a camera on a vehicle (1) and an evaluation unit which is connected to the camera, whereby by means of the evaluation unit, between two images (A, B) of the camera which are recorded in time succession, changes in the position and/or the size of at least one object (X) contained in the images can be determined, and from the changes, a speed of the vehicle (1) relative to the object (X) can be determined.

In the method according to the invention, at least two images in an area surrounding the vehicle are recorded using a horizontally aligned mono-camera on the vehicle at successive points in time, whereby between the images, changes in a position and/or a size of at least one object contained in the images, in particular, a recurring or continuously present object, are calculated, and from the changes, a speed of the vehicle relative to the object and over the ground is determined. This method makes it possible to determine the speed of the vehicle in a simple manner using a mono-camera already present in the vehicle. No additional cameras are required. The precision of the speed determined over the ground is restricted solely by the resolution of the camera used.

Preferably, an object is used which does not move in relation to the sub-ground of the vehicle. This makes it possible in a particularly simple manner to determine the speed of the vehicle over the ground, which also provides a sufficiently precise speed value in borderline situations.

In a preferred embodiment, at least one part of a roadway marking is used as an object. Changes in the position and/or the size of the roadway marking can be simply and precisely determined from the images. Here, at least one end of a middle line segment of the roadway marking is preferably used as an object. At these ends, the contrast to the roadway is very high. Consequently, the position and/or the size of the ends of recurring middle line segments and as a result, their changes, can be determined particularly simply and precisely in a series of images.

Advantageously, a longitudinal and/or a transverse speed of the vehicle is determined as the speed over the ground. These speeds can be used for other vehicle functions such as driver assistance systems for control and/or regulation, so that for these systems, the most precise speed value possible is provided.

According to a preferred embodiment of the invention, if several objects of the same type are contained in the images, errors in the changes of each of the objects of the same type are determined. In order to determine the speed, the same object is advantageously used for which the change shows the least severe error. In this manner, the precision of the speed determined is optimised.

For a simple design, a speed or movement vector of the vehicle relative to the object is determined, based on the changes to the object. Using the movement vector, the speed is then simply and quickly calculated to a particularly high degree of precision. For this purpose, in a possible embodiment, the movement vector is corrected and scaled in terms of its perspective, based on a calibration of the camera.

According to a preferred design, the images for identifying and/or localising the object and/or the changes are filtered. This simple image processing stage enables quick and precise identification and/or localisation of the object. Preferably, a high pass filter is used, which is particularly suitable for finding edges, e.g. the ends of the roadway marking.

Preferably, images are used from a series of images which is continuously recorded in sequence. This ensures that a speed value is continuously determined in real time as far as possible, and to the highest possible degree of precision.

According to a design of the method for determining the speed to a high degree of precision and as far as possible in real time, the changes to the object are determined from two images which follow immediately on from each other. In this way, the determined speed is provided as quickly as possible.

In addition, any imprecision due to possible speed differences in the time between the recordings of the images is at a low level.

Preferably, a camera is used which is at least partially aligned horizontally. Here, at least one of the three spatial axes of the camera runs horizontally. As a result, visual information is shown in the images of an area surrounding the vehicle in front of and/or behind the vehicle. In this area surrounding the vehicle, time changes are easy to determine using contrasts.

According to a further embodiment, a camera of a tracking system and/or a reverse drive camera and/or a camera for a blind angle is used as a camera. Here, the method can also be retrofitted with an already available camera in a vehicle. No additional hardware is required.

The device according to the invention comprises a camera of a vehicle and an evaluation unit which is connected to the camera, whereby by means of the evaluation unit, changes in the position and/or the size of at least one object contained in the images, particularly an object which recurs or which occurs continuously, can be determined between two images of the camera which follow each other in time, whereby from the changes, a speed of the vehicle relative to the object and over the ground can be calculated.

In particular for retrofitting the method in a vehicle, an already available camera of a tracking system and/or a reverse drive camera and/or a camera for a blind angle is used as a camera. Alternatively or in addition to this, a separate camera can be provided for determining the speed. Here, the camera is preferably arranged at the front and/or at the rear of the vehicle with a partially horizontal alignment in the driving direction.

The advantages attained with the invention consist in particular of the fact that by determining the speed of the vehicle based on changes to an object which in terms of the area surrounding the vehicle, in particular to the sub-ground does not move, which recurs along the roadway or which occurs continuously, the speed over the ground is determined in a simple manner. By determining the speed over the ground, an essentially precise speed value is given which can be used for controlling and/or regulating other operating functions of the vehicle. In addition, the method can be retrofitted. Here, already available cameras are used.

BRIEF DESCRIPTION OF THE DRAWINGS

Exemplary embodiments of the invention will be explained in greater detail with reference to the drawings, in which.

DETAILED DESCRIPTION OF THE DRAWINGS

Figure 1A:
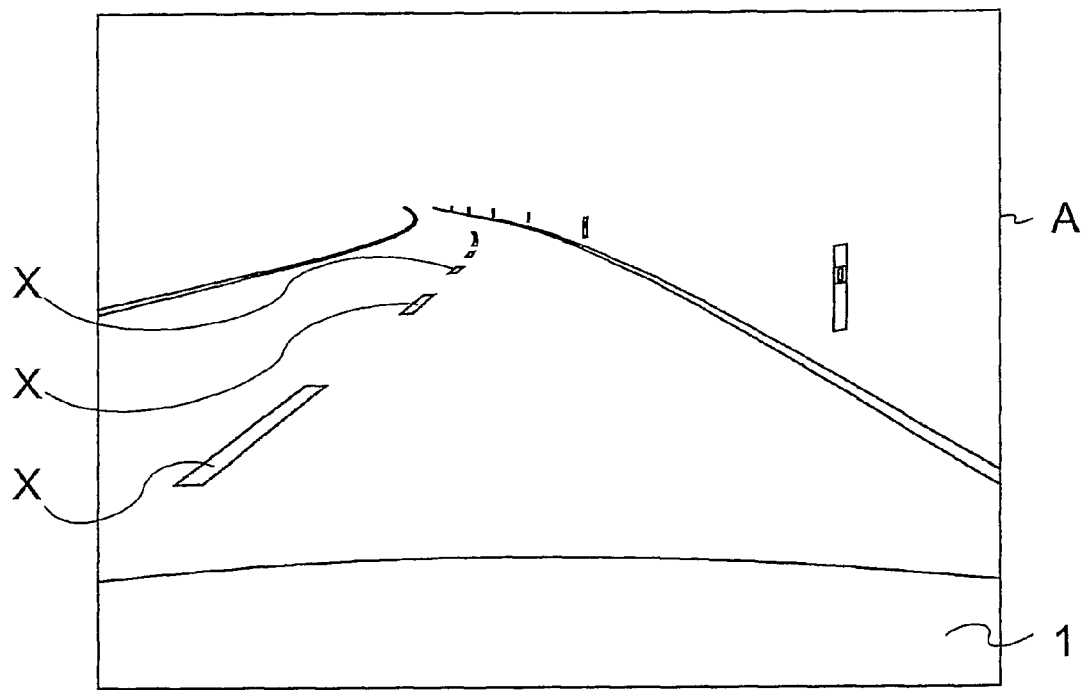
FIGS. 1a,1b show two images which are recorded in time succession of a camera which is directed forwards in a driving vehicle.

Parts which correspond to each other are assigned the same reference numerals in all Figures.

Figure 1B:
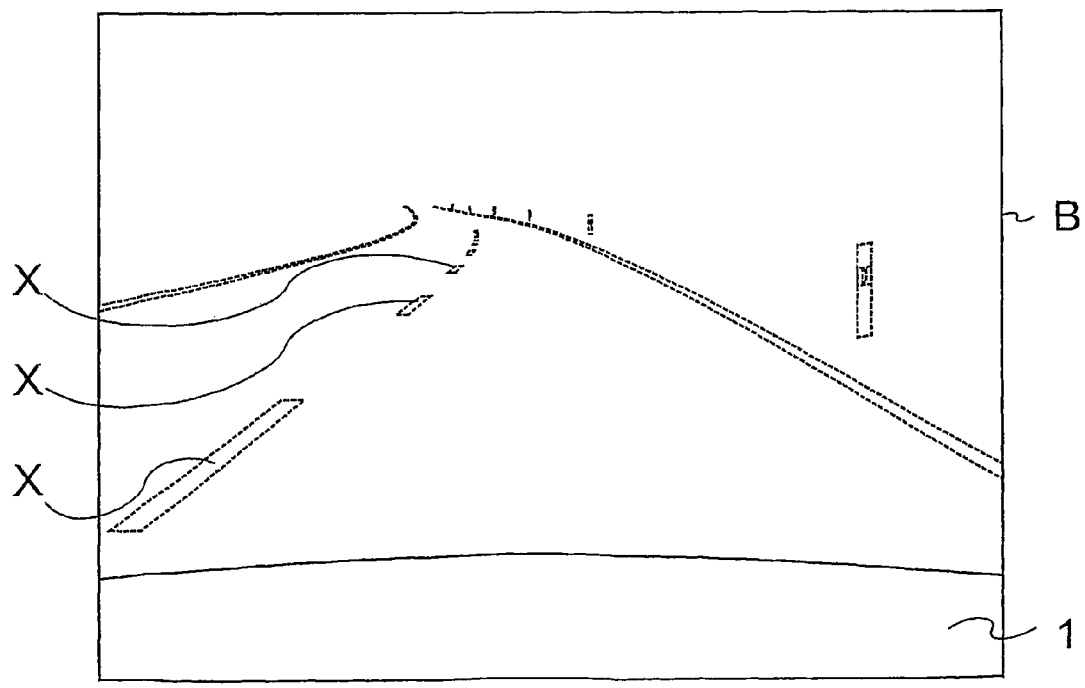

FIG. 1 shows in the sub-figures 1a and 1b two images A and B which are recorded immediately in succession of an area surrounding the vehicle in front of a vehicle 1 which is moving forwards, for example in a resolution of ~40×480 pixels. The images A and B originate from a continuous series of images, which are recorded for example using a camera which is directed forwards, e.g. a camera of a tracking system (lane departure warning) of the vehicle 1. Depending on the image resolution and the pre-specified setting of the camera, the images can be recorded with a higher or a lower resolution.

Between the recording of two successive images A and B, lies a time difference At, which is determined in particular by the recording speed of the camera. In this example, images are recorded with a frequency of 25 images per second. The time difference At between two images A and B thus totals 40 ins. In the recording range of the camera which is at least partially aligned horizontally, roadway markings can be identified both in front of and behind in the area surrounding the vehicle as objects X.

Due to the time difference At between the recordings of the images A and B and the forwards movement of the vehicle 1, in the image B in Figure 1b. which is subsequently recorded in time, the middle line segments of the roadway markings appear closer to the vehicle and, due to the perspective recording, enlarged, compared to the image A in Figure 1a, which is recorded earlier in time.

Using image processing procedures, the closest respective middle line segment is initially identified as object X in both images A and B. Here a variation of the relative position for example and the size of the object X is used for a sample comparison. For this purpose, in order to determine start values for an anticipated relative position and/or an anticipated size of the object X for quick identification and localisation of the object X, the movement in the time period At is preferably extrapolated based on the last determined speed. In addition or alternatively to this, information regarding the current speed can be used from a further source, such as the measurement of the wheel speed. During identification, the object X is localised by determining the positions and/or the sizes of the object X in both images A and B. The differences with regard to the position or the size of the object X are calculated as changes 2, as shown in FIG. 2.

Figure 2:
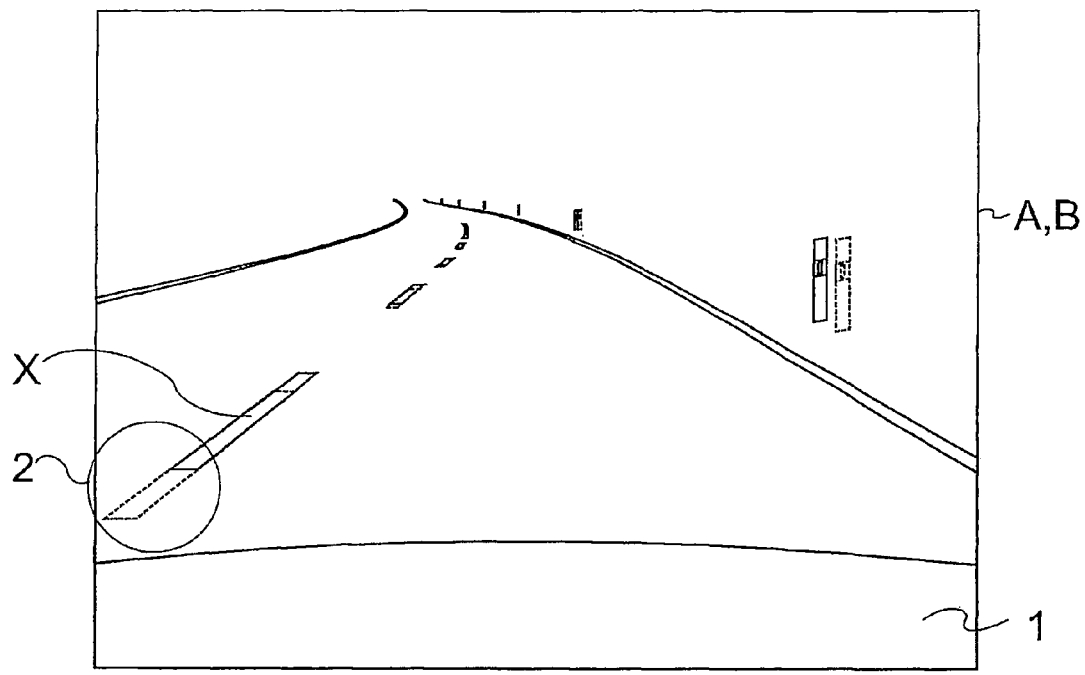
FIG. 2 shows the two images as an overlay.

In FIG. 2, the two images A and B from Figures 1a and 1b are shown overlaid for clarification purposes. The changes 2 are recognisable in the form of a displacement and enlargement of the next middle line segment.

From the determined changes 2, a speed or movement vector is calculated between the positions of the object X in the two images A and B. Here, the movement vector is scaled based on the specified camera calibration. Based on the movement vector and the time difference At between the recorded images A and B, the speed, for example the longitudinal and/or the transverse speed, of the vehicle 1 is determined.

The method will now be explained in greater detail below with reference to an example. Assuming that the middle line segments are approximately 6 in long, based on the maximum size of the middle line segments of approximately 150 pixels, it is calculated that one pixel of image A or B corresponds to a minimum of 4 cm. The next-closest middle line segment has a length of 22 pixels in images A or B, which corresponds to approximately 27 cm per pixel. With a camera with the resolution used in this example, a movement of approximately 4 cm per image change can be precisely determined in this way. The speed of the vehicle 1 can be calculated according to this example with a degree of precision of maximum:

$$0.04 \text{ m} * 25 \text{ s}^{-1} = 1 \text{ m/s} = 3.6 \text{ km/h}.$$

Should the next middle line segment have just vanished from the field of view of the camera, a movement can only be precisely calculated at approximately 16 cm per image change. This corresponds to a degree of precision of the calculated speed of:

$$0.16 \text{ m} * 25 \text{ s}^{-1} = 4 \text{ m/s} = 14.4 \text{ km/h}.$$

The determined values can, in an alternative embodiment, be averaged over several images A to Z, in order to reduce measuring errors. As a result, the current validity of the values is reduced, however. By averaging over 15 images, which in this example corresponds to just over half a second, degrees of precision of approximately 0.25 km/h to approximately 1 km/h can be achieved.

Figure 3:
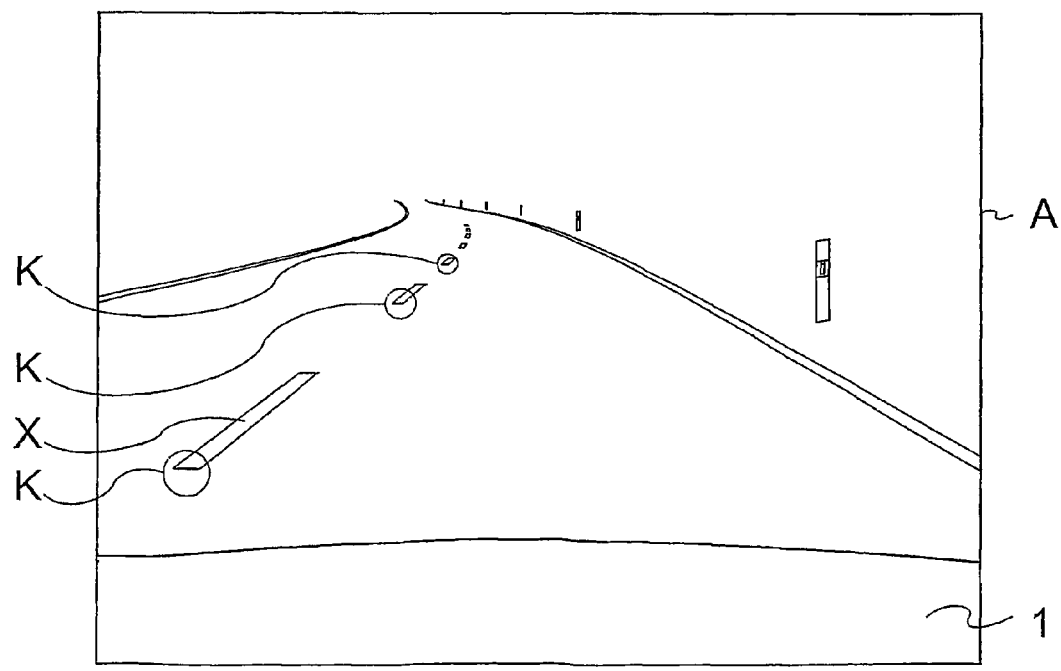
FIG. 3 shows a high pass filtered image.

For quick and safe image processing, the edges K of the ends and/or the beginnings of the middle line segments are additionally identified as objects X. For this purpose, the images A and B are previously high pass filtered. In this regard, FIG. 3 shows as an example the result of a high pass filtration of a recorded image. The edges K of the ends of the middle line segments are easy to recognize and identify using image processing.

In a further embodiment, several objects X can be processed and used to determine the speed over the ground. With several objects X in both images A and B, for each object X, the errors in its changes 2 are determined between the images A and B. The errors are calculated for example based on the lack of focus of the objects X in the images A and B. The speed of the vehicle 1 is then determined for example solely on the basis of the changes 2 of the same object X, for which the lowest error levels are determined for the changes 2.

With another method, images A and B of the roadway surface are recorded with time differences At using a camera which is directed backwards (also referred to as the reverse drive camera) on the vehicle 1, and a movement vector is determined from an even displacement of image areas. For this purpose, several correlations to different relative positions of an image area of an earlier image A are calculated with a later image B, for example. A rectangular area in the centre of image A is used for example as an image area. If the image area is identified as object X at a position in the image B recorded later, the movement vector results from the relative position of the identified image area to the later image B. Based on the scale of the illustration of the camera which is directed backwards, the speed of the vehicle 1 is then calculated from the movement vector. Since cameras which are directed backwards are usually equipped with a wide-angle lens, the transverse speed can be calculated to a greater degree of precision than with a camera which is directed forwards. A camera which is directed backwards also generally comprises a field of vision which is directed diagonally downwards, due to which fact the roadway directly behind the tail of the vehicle 1 can be shown, as a result of which roadway structures can be significantly better recognized than with a camera which is directed forwards.

The correlation coefficients required in this method can be calculated in the known manner as follows:

$$S(i, j) = \sum_{m=1}^{M} \sum_{n=1}^{N} \frac{I(i+m, j+n) \cdot R(m, n)}{\sqrt{S_I^2(i, j) \cdot S_R^2}} \quad [1]$$

with $$S_I^2 = \sum_{m=1}^{M} \sum_{n=1}^{N} I^2(i+m, j+n) \quad [2]$$

and $$S_R^2 = \sum_{m=1}^{M} \sum_{n=1}^{N} R^2(m, n). \quad [3]$$

The maximum of this correlation area represents the position of the best conformity between the partial image and the later image B.

In order to accelerate the identification and localization of a partial image, instead of the correlation coefficients, the totals of the quadratic deviations are preferably calculated as an approximation of the correlation area as follows:

$$D(i, j) = \sum_{m=1}^{M} \sum_{n=1}^{N} [I(i+m, j+n) - R(m, n)]^2. \quad [4]$$

A perfect conformity at a position (i, i) would result in the value 0 for this position. In order to determine the relative position of the image area and thus of the movement vector, the minimum of the area of the totals of the quadratic deviations is advantageously calculated.

In order to improve the degree of precision, it is also possible to use several cameras on a vehicle 1 at once. Advantageously, the respective speed values determined are weighted and/or averaged, in order to attain the most precise overall value possible. A standard measurement of the wheel speed can also be used here.

The invention claimed is:

1. A method for determining a speed of a vehicle (1), the method comprising:
   recording at least two images (A, B) of an area surrounding the vehicle in time succession using a mono-camera on the vehicle (1) wherein the mono-camera is at least partially horizontally aligned;
   determining, between the images (A, B), changes (2) in a position and a size of at least one object (X) contained in the images, wherein the object (X) is fixed in relation to a sub-ground of the vehicle (1) and is at least one end of a middle line segment of a roadway marking; and
   determining from the changes the speed of the vehicle (1) relative to the object (X).

2. The method for determining a speed of a vehicle according to claim 1, wherein at least one of a longitudinal or a transverse speed of the vehicle (1) is determined.

3. The method for determining a speed of a vehicle according to claim 1, wherein if several objects (X) of the same type are contained in the images (A, B), errors in the changes (2) are determined for each of the objects (X) of the same type, and in order to determine the speed, the object (X) is used for which the change (2) shows the least severe error.

4. The method for determining a speed of a vehicle according to claim 1, wherein that in order to determine the speed, from the changes (2), a movement vector of the vehicle (1) is determined relative to the object (X).

5. The method for determining a speed of a vehicle according to claim 4, wherein the movement vector is perspectively corrected and scaled based on a calibration of the camera.

6. The method for determining a speed of a vehicle according to claim 1, wherein the images (A, B) are filtered.

7. The method for determining a speed of a vehicle according to claim 1, wherein the images (A, B) are used from a series recorded continuously in succession.

8. The method for determining a speed of a vehicle according to claim 7, wherein the changes are determined from two images (A, B) which follow immediately in succession.

9. The method for determining a speed of a vehicle according to claim 1, wherein the mono-camera is a camera of a tracking system, or a reverse drive camera, or a camera for a blind angle is used as a camera.

10. A device for determining a speed of vehicle, the device comprising:
a mono-camera on a vehicle (1) for recording two or more images (A,B) in time succession, wherein the mono-camera is aligned at least partially horizontally; and an evaluation unit which is connected to the camera, wherein the evaluation unit determines, between the two or more images (A, B), changes in a position and a size of at least one object (X) contained in the images, and from the changes, the speed of the vehicle (1) relative to the object (X) can be determined; wherein the at least one object (X) is at least one end of a middle line segment of a roadway marking.

11. The device of claim 10, wherein the mono-camera is a camera of a tracking system, a reverse drive camera, or a camera for a blind angle.

* * * * *